(12) United States Patent
Hussain et al.

(10) Patent No.: US 9,430,268 B2
(45) Date of Patent: Aug. 30, 2016

(54) SYSTEMS AND METHODS FOR SUPPORTING MIGRATION OF VIRTUAL MACHINES ACCESSING REMOTE STORAGE DEVICES OVER NETWORK VIA NVME CONTROLLERS

(71) Applicant: CAVIUM, INC., San Jose, CA (US)

(72) Inventors: Muhammad Raghib Hussain, Saratoga, CA (US); Vishal Murgai, Cupertino, CA (US); Manojkumar Panicker, Sunnyvale, CA (US); Faisal Masood, San Jose, CA (US); Brian Folsom, Northborough, MA (US); Richard Eugene Kessler, Northborough, MA (US)

(73) Assignee: CAVIUM, INC., San Jose, CA (US)

( * ) Notice: Subject to any disclaimer, the term of this patent is extended or adjusted under 35 U.S.C. 154(b) by 0 days.

(21) Appl. No.: 14/537,758

(22) Filed: Nov. 10, 2014

(65) Prior Publication Data
US 2015/0317177 A1    Nov. 5, 2015

Related U.S. Application Data

(60) Provisional application No. 61/987,956, filed on May 2, 2014.

(51) Int. Cl.
*G06F 9/44* (2006.01)
*G06F 9/45* (2006.01)
(Continued)

(52) U.S. Cl.
CPC ........... *G06F 9/45558* (2013.01); *G06F 3/067* (2013.01); *G06F 8/71* (2013.01); *G06F 9/44505* (2013.01); *G06F 9/45537* (2013.01); *G06F 11/3664* (2013.01); *G06F 2009/4557* (2013.01)

(58) Field of Classification Search
CPC .............. G06F 8/20; G06F 8/52; G06F 8/71; G06F 9/44505; G06F 11/261; G06F 11/3664
See application file for complete search history.

(56) References Cited

U.S. PATENT DOCUMENTS

| 5,329,318 | A  | 7/1994 | Keith |
| 6,990,395 | B2 | 1/2006 | Ransom |

(Continued)

OTHER PUBLICATIONS

Jo et al., "Efficient Live Migration of Virtual Machines Using Shared Storage", 2013 ACM, VEE'13, Mar. 2013, Houston, Texas, USA, pp. 41-50; <http://dl.acm.org/citation.cfm?id=2451524&CFID=608361263&CFTOKEN=34795460>.*

(Continued)

*Primary Examiner* — Thuy Dao
*Assistant Examiner* — Ben C Wang
(74) *Attorney, Agent, or Firm* — Duane Morris LLP; David T. Xue (57) ABSTRACT

A new approach is proposed virtual machines (VMs) accessing remote storage devices over a network via non-volatile memory express (NVMe) controllers to migrate live from a current host to a destination host. A first virtual NVMe controller running on a first physical NVMe controller enables a first VM running on the current host to perform storage operations to logical volumes mapped to the remote storage devices over the network as if they were local storage volumes. During VM migration, the current host puts the first virtual NVMe controller into quiesce state and saves an image of its states. A second virtual NVMe controller is created on a second physical NVMe controller using the saved image, which is configured to serve a second VM on the destination host. The second virtual NVMe controller resumes the storage operations to the remote storage devices without being interrupted by the VM migration.

25 Claims, 6 Drawing Sheets

(51) Int. Cl.
*G06F 9/455* (2006.01)
*G06F 3/06* (2006.01)
G06F 9/445 (2006.01)
G06F 11/36 (2006.01)

(56) References Cited

U.S. PATENT DOCUMENTS

| | | | |
|---|---|---|---|
| 8,214,539 B1 | 7/2012 | Kulanko | |
| 8,239,655 B2* | 8/2012 | Goggin et al. | 711/203 |
| 8,291,135 B2* | 10/2012 | Subramanian et al. | 710/39 |
| 8,756,441 B1 | 6/2014 | Mullins | |
| 9,098,214 B1* | 8/2015 | Vincent et al. | |
| 2005/0060590 A1 | 3/2005 | Bradley | |
| 2008/0235293 A1 | 9/2008 | Levering | |
| 2009/0037680 A1 | 2/2009 | Colbert et al. | |
| 2009/0307388 A1 | 12/2009 | Tchapda | |
| 2010/0082922 A1* | 4/2010 | George et al. | 711/162 |
| 2010/0325371 A1 | 12/2010 | Jagadish | |
| 2011/0173302 A1* | 7/2011 | Rider | G06F 9/44505 709/220 |
| 2011/0173303 A1* | 7/2011 | Rider | G06F 9/44505 709/220 |
| 2011/0238792 A1* | 9/2011 | Phillips | G06F 15/177 709/220 |
| 2011/0271278 A1* | 11/2011 | Dittrich | G06F 9/45558 718/1 |
| 2012/0042033 A1* | 2/2012 | Ayala et al. | 709/216 |
| 2012/0042034 A1* | 2/2012 | Goggin et al. | 709/216 |
| 2012/0110259 A1 | 5/2012 | Mills | |
| 2012/0117212 A1* | 5/2012 | Fries | G06F 8/61 709/223 |
| 2012/0117558 A1* | 5/2012 | Futty | G06F 9/44505 717/176 |
| 2012/0150933 A1 | 6/2012 | Boersma | |
| 2012/0159473 A1* | 6/2012 | Tsirkin | G06F 9/45558 718/1 |
| 2012/0227058 A1* | 9/2012 | Hunt | G06F 9/45558 719/318 |
| 2013/0014103 A1* | 1/2013 | Reuther et al. | 718/1 |
| 2013/0042056 A1 | 2/2013 | Shats | |
| 2013/0054521 A1* | 2/2013 | Cai | G06F 17/30578 707/613 |
| 2013/0097369 A1 | 4/2013 | Talagala | |
| 2013/0191590 A1* | 7/2013 | Malwankar | 711/114 |
| 2013/0198312 A1 | 8/2013 | Tamir | |
| 2013/0204849 A1 | 8/2013 | Chacko | |
| 2013/0318197 A1 | 11/2013 | Plaisted | |
| 2014/0007189 A1 | 1/2014 | Huynh et al. | |
| 2014/0059226 A1 | 2/2014 | Messerli et al. | |
| 2014/0059359 A1* | 2/2014 | Bahirat | G06F 1/3253 713/300 |
| 2014/0089276 A1 | 3/2014 | Satish et al. | |
| 2014/0137099 A1* | 5/2014 | Che | G06F 9/44505 717/174 |
| 2014/0173149 A1 | 6/2014 | Walker et al. | |
| 2014/0195634 A1* | 7/2014 | Kishore et al. | 709/213 |
| 2014/0281040 A1 | 9/2014 | Liu | |
| 2014/0282521 A1 | 9/2014 | Lango et al. | |
| 2014/0298335 A1* | 10/2014 | Regev | G06F 11/263 718/1 |
| 2014/0317206 A1 | 10/2014 | Lomelino et al. | |
| 2014/0331001 A1 | 11/2014 | Liu | |
| 2014/0359556 A1* | 12/2014 | Jujare | G06F 8/20 717/104 |
| 2015/0120971 A1 | 4/2015 | Bae et al. | |
| 2015/0169291 A1* | 6/2015 | Dube | G06F 8/20 717/101 |
| 2015/0234617 A1* | 8/2015 | Li et al. | 711/114 |
| 2015/0242224 A1* | 8/2015 | Simoncelli | G06F 9/44505 718/1 |

OTHER PUBLICATIONS

Kaur et al., "Virtual Machine Migration in Cloud Datacenters", Aug. 2014, IJARCSSE, pp. 190-193; <http://www.ijarcsse.com/docs/papers/Volume_4/8_August2014/V4I8-0331.pdf>.*

Sun et al., "Live Migration for Multiple Correlated Virtual Machines in Cloud-based Data Centers", 2015 IEEE, Sep. 2015, pp. 1-14; <http://ieeexplore.ieee.org/stamp/stamp.jsp?tp=&arnumber=7254233>.*

* cited by examiner

| Namespace(s)/Logical volume(s) | Remote physical storage volumes |
|---|---|
| Ns_1 | Vol_1 |
| Ns_2 | Vol_2 |
| Ns_2 | Vol_3 |
| Ns_m | Vol_n |

SYSTEMS AND METHODS FOR SUPPORTING MIGRATION OF VIRTUAL MACHINES ACCESSING REMOTE STORAGE DEVICES OVER NETWORK VIA NVME CONTROLLERS

CROSS-REFERENCE TO RELATED APPLICATIONS

This application claims the benefit of U.S. Provisional Patent Application No. 61/987,956, filed May 2, 2014 and entitled "Systems and methods for accessing extensible storage devices over a network as local storage via NVMe controller," which is incorporated herein in its entirety by reference.

This application is related to co-pending U.S. patent application Ser. No. 14/279,712, filed May 16, 2014 and entitled "Systems and methods for NVMe controller virtualization to support multiple virtual machines running on a host," which is incorporated herein in its entirety by reference.

This application is related to co-pending U.S. patent application Ser. No. 14/300,552, filed Jun. 10, 2014 and entitled "Systems and methods for enabling access to extensible storage devices over a network as local storage via NVMe controller," which is incorporated herein in its entirety by reference.

This application is related to co-pending U.S. patent application Ser. No. 14/317,467, filed Jun. 27, 2014 and entitled "Systems and methods for enabling local caching for remote storage devices over a network via NVMe controller," which is incorporated herein in its entirety by reference.

This application is related to co-pending U.S. patent application Ser. No. 14/473,111, filed Aug. 29, 2014 and entitled "Systems and methods for enabling value added services for extensible storage devices over a network via NVMe controller," which is incorporated herein in its entirety by reference.

This application is related to co-pending U.S. patent application Ser. No. 14/496,916, filed Sep. 25, 2014 and entitled "Systems and methods for supporting hot plugging of remote storage devices accessed over a network via NVMe controller," which is incorporated herein in its entirety by reference.

BACKGROUND

Service providers have been increasingly providing their web services (e.g., web sites) at third party data centers in the cloud by running a plurality of virtual machines (VMs) on a host/server at the data center. Here, a VM is a software implementation of a physical machine (i.e. a computer) that executes programs to emulate an existing computing environment such as an operating system (OS). The VM runs on top of a hypervisor, which creates and runs one or more VMs on the host. The hypervisor presents each VM with a virtual operating platform and manages the execution of each VM on the host. By enabling multiple VMs having different operating systems to share the same host machine, the hypervisor leads to more efficient use of computing resources, both in terms of energy consumption and cost effectiveness, especially in a cloud computing environment.

Non-volatile memory express, also known as NVMe or NVM Express, is a specification that allows a solid-state drive (SSD) to make effective use of a high-speed Peripheral Component Interconnect Express (PCIe) bus attached to a computing device or host. Here the PCIe bus is a high-speed serial computer expansion bus designed to support hardware I/O virtualization and to enable maximum system bus throughput, low I/O pin count and small physical footprint for bus devices. NVMe typically operates on a non-volatile memory controller of the host, which manages the data stored on the non-volatile memory (e.g., SSD, SRAM, flash, HDD, etc.) and communicates with the host. Such an NVMe controller provides a command set and feature set for PCIe-based SSD access with the goals of increased and efficient performance and interoperability on a broad range of enterprise and client systems. The main benefits of using an NVMe controller to access PCIe-based SSDs are reduced latency, increased Input/Output (I/O) operations per second (IOPS) and lower power consumption, in comparison to Serial Attached SCSI (SAS)-based or Serial ATA (SATA)-based SSDs through the streamlining of the I/O stack.

Currently, a VM running on the host can access a plurality of storage devices (e.g., PCIe-based SSDs) locally coupled to the physical NVMe controller attached to the host. Here, the number of storage volumes the VM can access is constrained by the physical limitation on the maximum number of physical storage units/volumes that can be locally coupled to the physical NVMe controller. Since the VMs running on the host at the data center may belong to different web service providers and each of the VMs may have its own storage needs that may change in real time during operation and are thus unknown to the host, it is impossible to predict and allocate a fixed amount of storage volumes ahead of time for all the VMs running on the host that will meet their storage needs. Enabling access to remote storage devices over a network can provide extensible/flexible storage volumes to the VMs during a storage operation.

When the VM is migrated (either live or regular/quiesced) from the current host (the source host) it is running on to another host (the destination host) without causing any interruption to the users or applications served by the VM, all resources (e.g., data, storage, network connections, etc.) currently used by the VM need to be transferred/copied from the source machine to the destination machine. Since the VM may have pending storage operations to the remote (not just local) storage devices via the NVMe controller, it is important to be able to handle such pending storage operations via the NVMe controller properly during the migration of the VM.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support (live or quiesced) migration of virtual machines (VMs) accessing a set of remote storage devices over a network via non-volatile memory express (NVMe) controllers from a current host to a destination host. At the time of the VM migration, a first virtual NVMe controller running on a first physical NVMe controller enables a first VM running on the current host to access and perform a plurality of storage operations to one or more logical volumes mapped to the remote storage devices over the network as if they were local storage volumes. During the VM migration process, the current host puts the first virtual NVMe controller serving the first VM into a quiesce state, and captures and saves an image of states of the first virtual NVMe controller on the current host. A second virtual NVMe controller is then created on a second physical NVMe controller using the saved image, wherein the second virtual NVMe controller is configured to serve a second VM on the destination host and has exactly the same states as the first virtual NVMe controller. The second virtual NVMe controller then initiates and/or resumes the storage operations to the remote storage devices after the first VM on the first host is migrated to the second VM on the second host without any interruption.

Unlike normal VM migration where the VM is served by an NVMe controller having locally attached storage devices only, VM migration for an associated NVMe controller that enables access to remote storage devices for the VM presents additional challenges. By capturing the states of the virtual NVMe controller serving the VM being migrated and creating the same states for a new virtual NVMe controller on the physical NVMe controller coupled to the destination host, the proposed approach ensures that the pending storage operations by the VM to the remote storage devices will not be interrupted and the network connections and any pending storage transactions to the remote storage devices will not be lost during the migration of the VM. As a result, the entire VM migration becomes a seamless process and can be made completely transparent to the VM and its users.

Figure 1:
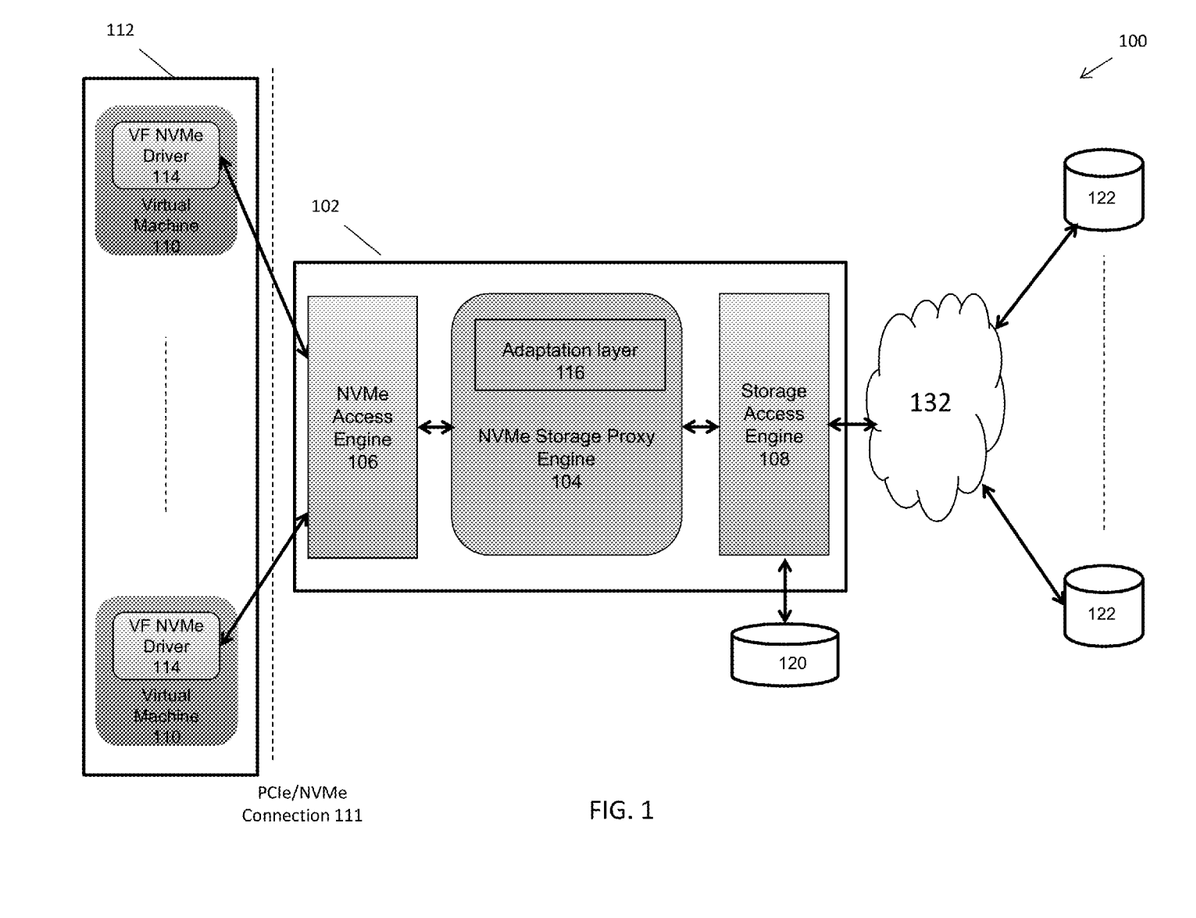
FIG. 1 depicts an example of a diagram of a system to support virtualization of remote storage devices to be presented as local storage devices to VMs in accordance with some embodiments.

FIG. 1 depicts an example of a diagram of system 100 to support virtualization of remote storage devices to be presented as local storage devices to VMs. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a physical NVMe controller 102 having at least an NVMe storage proxy engine 104, NVMe access engine 106 and a storage access engine 108 running on the NVMe controller 102. Here, the physical NVMe controller 102 is a hardware/firmware NVMe module having software, firmware, hardware, and/or other components that are used to effectuate a specific purpose. As discussed in details below, the physical NVMe controller 102 comprises one or more of a CPU or microprocessor, a storage unit or memory (also referred to as primary memory) such as RAM, with software instructions stored for practicing one or more processes. The physical NVMe controller 102 provides both Physical Functions (PFs) and Virtual Functions (VFs) to support the engines running on it, wherein the engines will typically include software instructions that are stored in the storage unit of the physical NVMe controller 102 for practicing one or more processes. As referred to herein, a PF function is a PCIe function used to configure and manage the single root I/O virtualization (SR-IOV) functionality of the controller such as enabling virtualization and exposing PCIe VFs, wherein a VF function is a lightweight PCIe function that supports SR-IOV and represents a virtualized instance of the controller 102. Each VF shares one or more physical resources on the physical NVMe controller 102, wherein such resources include but are not limited to on-controller memory 208, hardware processor 206, interface to storage devices 222, and network driver 220 of the physical NVMe controller 102 as depicted in FIG. 2 and discussed in details below.

In the example of FIG. 1, a computing unit/appliance/host 112 runs a plurality of VMs 110, each configured to provide a web-based service to clients over the Internet. Here, the host 112 can be a computing device, a communication device, a storage device, or any electronic device capable of running a software component. For non-limiting examples, a computing device can be, but is not limited to, a laptop PC, a desktop PC, a mobile device, or a server machine such as an x86/ARM server. A communication device can be, but is not limited to, a mobile phone.

In the example of FIG. 1, the host 112 is coupled to the physical NVMe controller 102 via a PCIe/NVMe link/connection 111 and the VMs 110 running on the host 112 are configured to access the physical NVMe controller 102 via the PCIe/NVMe link/connection 111. For a non-limiting example, the PCIe/NVMe link/connection 111 is a PCIe Gen3 x8 bus.

Figure 2:
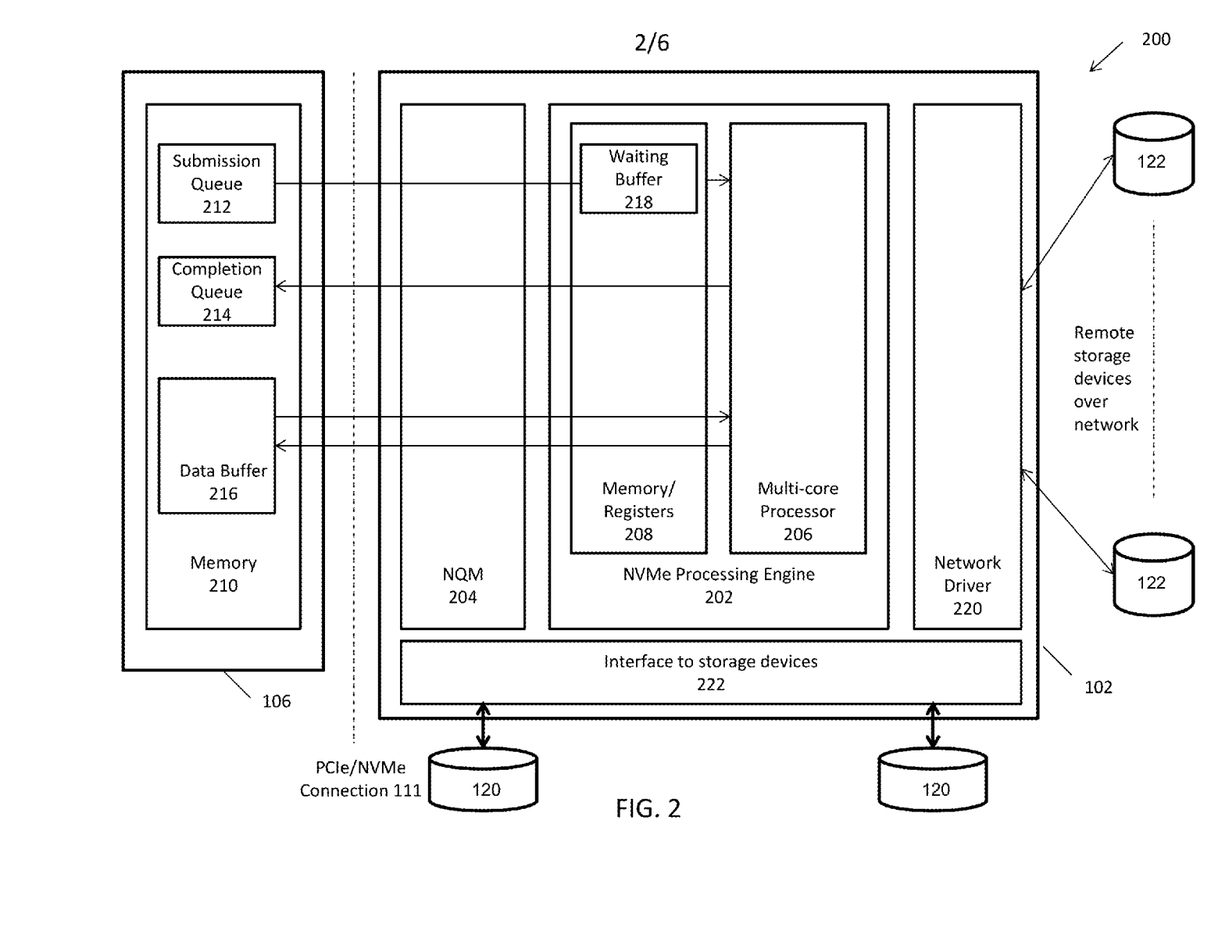
FIG. 2 depicts an example of hardware implementation of the physical NVMe controller depicted in FIG. 1 in accordance with some embodiments.

FIG. 2 depicts an example of hardware implementation 200 of the physical NVMe controller 102 depicted in FIG. 1. As shown in the example of FIG. 2, the hardware implementation 200 includes at least an NVMe processing engine 202, and an NVMe Queue Manager (NQM) 204 implemented to support the NVMe processing engine 202. Here, the NVMe processing engine 202 includes one or more CPUs/processors 206 (e.g., a multi-core/multi-threaded ARM/MIPS processor), and a primary memory 208 such as DRAM, which may further include a plurality of registers and buffers. The NVMe processing engine 202 is configured to execute all NVMe instructions/commands and to provide results upon completion of the instructions. The hardware-implemented NQM 204 provides a front-end interface to the engines that execute on the NVMe processing engine 202. In some embodiments, the NQM 204 manages at least a submission queue 212 that includes a plurality of administration and control instructions to be processed by the NVMe processing engine 202 and a completion queue 214 that includes status of the plurality of administration and control instructions that have been processed by the NVMe processing engine 202. In some embodiments, the NQM 204 further manages one or more data buffers 216 that include data read from or to be written to a storage device via the NVMe controllers 102. In some embodiments, one or more of the submission queue 212, completion queue 214, and data buffers 216 are maintained within memory 210 of the host 112. In some embodiments, the hardware implementation 200 of the physical NVMe controller 102 further includes an interface to storage devices 222, which enables a plurality of optional storage devices 120 to be coupled to and accessed by the physical NVMe controller 102 locally, and a network driver 220, which enables a plurality of storage devices 122 to be connected to the NVMe controller 102 remotely of a network.

In the example of FIG. 1, the NVMe access engine 106 of the NVMe controller 102 is configured to receive and manage instructions and data for read/write operations from the VMs 110 running on the host 102. When one of the VMs 110 running on the host 112 performs a read or write operation, it places a corresponding instruction in a submission queue 212, wherein the instruction is in NVMe format. During its operation, the NVMe access engine 106 utilizes the NQM 204 to fetch the administration and/or control commands from the submission queue 212 on the host 112 based on a "doorbell" of read or write operation, wherein the doorbell is generated by the VM 110 and received from the host 112. The NVMe access engine 106 also utilizes the NQM 204 to fetch the data to be written by the write operation from one of the data buffers 216 on the host 112. The NVMe access engine 106 then places the fetched commands in a waiting buffer 218 in the memory 208 of the NVMe processing engine 202 waiting for the NVMe Storage Proxy Engine 104 to process. Once the instructions are processed, The NVMe access engine 106 puts the status of the instructions back in the completion queue 214 and notifies the corresponding VM 110 accordingly. The NVMe access engine 106 also puts the data read by the read operation to the data buffer 216 and makes it available to the VM 110.

In some embodiments, each of the VMs 110 running on the host 112 has an NVMe driver 114 configured to interact with the NVMe access engine 106 of the NVMe controller 102 via the PCIe/NVMe link/connection 111. In some embodiments, each of the NVMe driver 114 is a virtual function (VF) driver configured to interact with the PCIe/NVMe link/connection 111 of the host 112 and to set up a communication path between its corresponding VM 110 and the NVMe access engine 106 and to receive and transmit data associated with the corresponding VM 110. In some embodiments, the VF NVMe driver 114 of the VM 110 and the NVMe access engine 106 communicate with each other through a SR-IOV PCIe connection as discussed above.

In some embodiments, the VMs 110 run independently on the host 112 and are isolated from each other so that one VM 110 cannot access the data and/or communication of any other VMs 110 running on the same host. When transmitting commands and/or data to and/or from a VM 110, the corresponding VF NVMe driver 114 directly puts and/or retrieves the commands and/or data from its queues and/or the data buffer, which is sent out or received from the NVMe access engine 106 without the data being accessed by the host 112 or any other VMs 110 running on the same host 112.

In the example of FIG. 1, the storage access engine 108 of the NVMe controller 102 is configured to access and communicate with a plurality of non-volatile disk storage devices/units, wherein each of the storage units is either (optionally) locally coupled to the NVMe controller 102 via the interface to storage devices 222 (e.g., local storage devices 120), or remotely accessible by the physical NVMe controller 102 over a network 132 (e.g., remote storage devices 122) via the network communication interface/driver 220 following certain communication protocols such as TCP/IP protocol. In some embodiments, the remote storage devices 122 are coupled to one or more remote storage controllers (not shown) that are accessible by the storage access engine 108 over the network. As referred to herein, each of the locally attached and remotely accessible storage devices can be a non-volatile (non-transient) storage device, which can be but is not limited to, a solid-state drive (SSD), a static random-access memory (SRAM), a magnetic hard disk drive (HDD), and a flash drive. The network 132 can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

In the example of FIG. 1, the NVMe storage proxy engine 104 of the NVMe controller 102 is configured to collect volumes of the remote storage devices accessible via the storage access engine 108 over the network under the storage network protocol and convert the storage volumes of the remote storage devices to one or more NVMe namespaces each including a plurality of logical volumes/devices (a collection of logical blocks) to be accessed by VMs 110 running on the host 112. As such, the NVMe namespaces may include volumes mapped to both the storage devices locally attached to the NVMe controller 102 and those remotely accessible by the storage access engine 108 under the storage network protocol. The storage network protocol is used to access a remote storage device accessible over the network, wherein such storage network protocol can be but is not limited to Internet Small Computer System Interface (iSCSI). iSCSI is an Internet Protocol (IP)-based storage networking standard for linking data storage devices by carrying SCSI commands over the networks. By enabling access to remote storage devices over the network, iSCSI increases the capabilities and performance of storage data transmission over local area networks (LANs), wide area networks (WANs), and the Internet.

In some embodiments, the NVMe storage proxy engine 104 organizes the remote storage devices as one or more logical or virtual volumes/blocks in the NVMe namespaces, to which the VMs 110 can access and perform I/O operations as if they were local storage volumes. Here, each volume is classified as logical or virtual since it maps to one or more physical storage devices either locally attached to or remotely accessible by the NVMe controller 102 via the storage access engine 108. In some embodiments, multiple VMs 110 running on the host 112 are enabled to access the same logical volume or virtual volume and each logical/virtual volume can be shared among multiple VMs.

In some embodiments, the NVMe storage proxy engine 104 further includes an adaptation layer/shim 116, which is a software component configured to manage message flows between the NVMe namespaces and the remote physical storage volumes. Specifically, when instructions for storage operations (e.g., read/write operations) on one or more logical volumes/namespaces are received from the VMs 110 via the NVMe access engine 106, the adaptation layer/shim 116 converts the instructions under NVMe specification to one or more corresponding instructions on the remote physical storage volumes under the storage network protocol such as iSCSI according to the lookup table. Conversely, when results and/or feedbacks on the storage operations performed on the remote physical storage volumes are received via the storage access engine 108, the adaptation layer/shim 116 also converts the results to feedbacks about the operations on the one or more logical volumes/namespaces and provides such converted results to the VMs 110.

Figure 3:
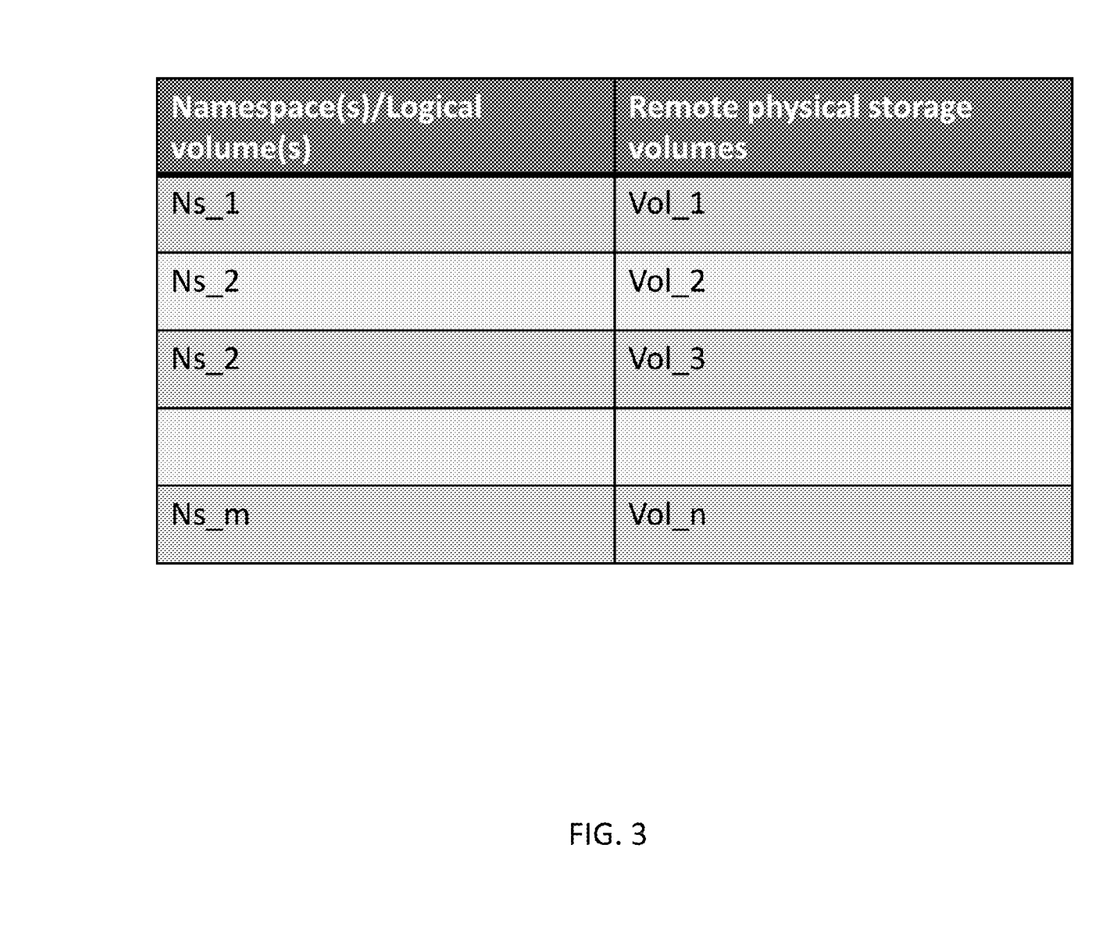
FIG. 3 depicts a non-limiting example of a lookup table that maps between the NVMe namespaces of the logical volumes and the remote physical storage volumes in accordance with some embodiments.

In some embodiments, the NVMe storage proxy engine 104 establishes a lookup table that maps between the NVMe namespaces of the logical volumes, Ns_1, . . . , Ns_m, and the remote physical storage devices/volumes, Vol_1, . . . , Vol_n, accessible over the network and imported to the NVMe controller 102, as shown by the non-limiting example depicted in FIG. 3. Here, there is a multiple-to-multiple correspondence between the NVMe namespaces and the physical storage volumes, meaning that one namespace (e.g., Ns_2) may correspond to a logical volume that maps to a plurality of remote physical storage volumes (e.g., Vol_2 and Vol_3), and a single remote physical storage volume may also be included in a plurality of logical volumes and accessible by the VMs 110 via their corresponding NVMe namespaces.

In the example of FIG. 1, the NVMe access engine 106 of the NVMe controller 102 is configured to export and present the NVMe namespaces and logical volumes of the remote physical storage devices 122 to the VMs 110 running on the host 112 as accessible storage devices that are no different from those locally connected storage devices 120. The NVMe access engine 106 is also configured to accept instructions from the VMs 110 to perform one or more read/write operations on the logical volumes that map to the remote storage devices 122. The actual mapping and operations on the remote storage devices 122 over the network using iSCSI-like storage network protocol performed by the NVMe controller 102 are transparent to the VMs 110.

Figure 4:
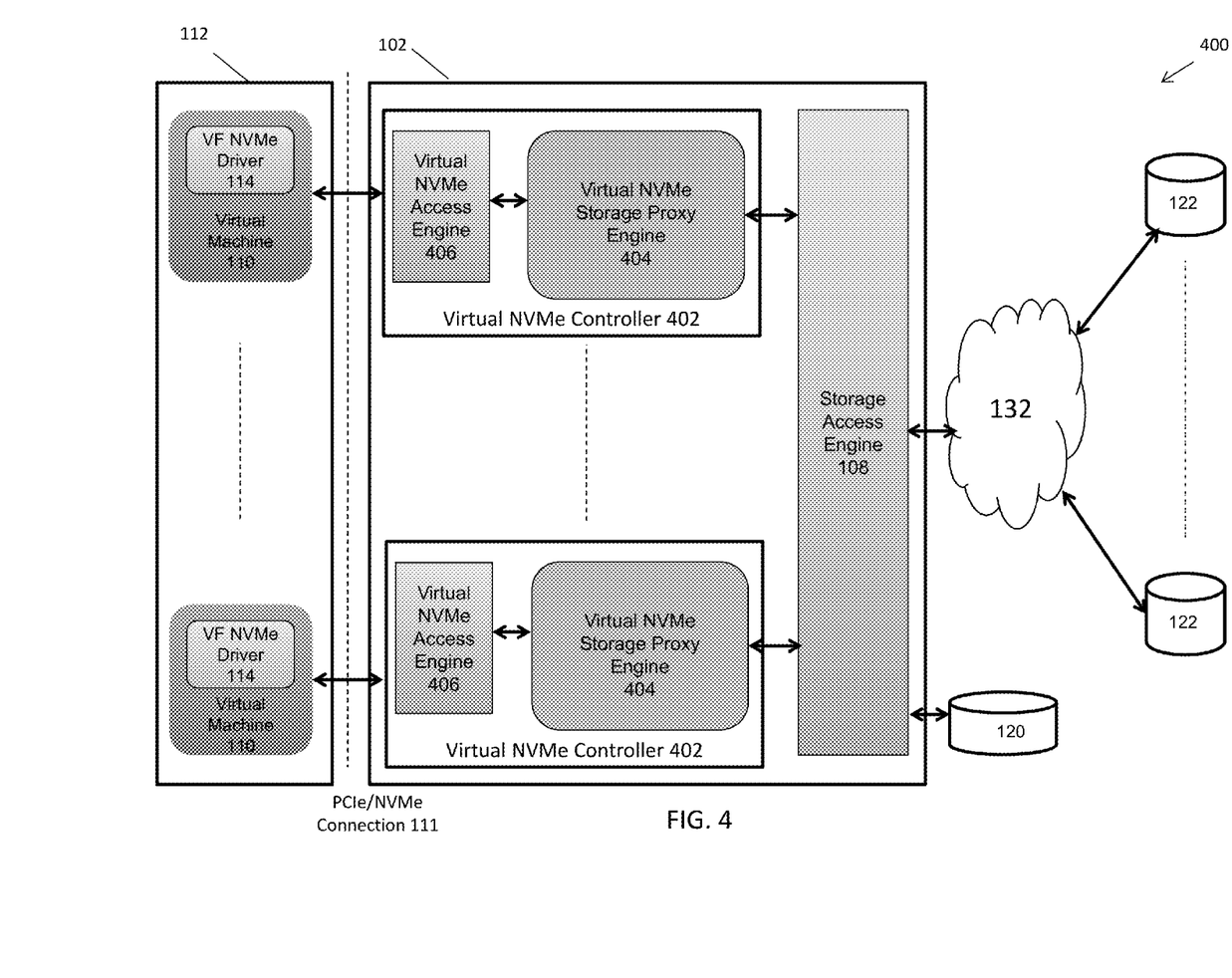
FIG. 4 depicts a non-limiting example of a diagram of a system to support virtualization of a plurality of remote storage devices to be presented as local storage devices to VMs, wherein the physical NVMe controller further includes a plurality of virtual NVMe controllers in accordance with some embodiments.

FIG. 4 depicts a non-limiting example of a diagram of system 400 to support virtualization of remote storage devices as local storage devices for VMs, wherein the physical NVMe controller 102 further includes a plurality of virtual NVMe controllers or virtual functions (VFs) 402. In the example of FIG. 4, the plurality of virtual NVMe controllers 402 run on and interact with the single physical NVMe controller 102 where each of the virtual NVMe controllers 402 is a hardware accelerated software engine that supports single root I/O virtualization (SR-IOV) of the NVMe controller 102 and shares one or more physical resources provided by the NVMe controller 102 with other virtual NVMe controllers 402. Each of the virtual NVMe controllers 402 represents a virtualized instance of the NVMe controller 102 and emulates the functionalities of the NVMe controller 102 to be accessed by one of the VMs 110 running on the host 112.

In some embodiments, the virtual NVMe controllers 402 have a one-to-one correspondence with the VMs 110, wherein each virtual NVMe controller 104 interacts with and allows access from only one of the VMs 110. Each virtual NVMe controller 104 is assigned to and dedicated to support one and only one of the VMs 110 to access its storage devices, wherein any single virtual NVMe controller 104 is not shared across multiple VMs 110.

In some embodiments, each virtual NVMe controller 402 is configured to support identity-based authentication and access from its corresponding VM 110 for its operations, wherein each identity permits a different set of API calls for different types of commands/instructions used to create, initialize and manage the virtual NVMe controller 402, and/or provide access to the logic volume for the VM 110. In some embodiments, the types of commands made available by the virtual NVMe controller 402 vary based on the type of user requesting access through the VM 110 and some API calls do not require any user login. For a non-limiting example, different types of commands can be utilized to initialize and manage virtual NVMe controller 402 running on the physical NVMe controller 102.

As shown in the example of FIG. 4, each virtual NVMe controller 402 may further include a virtual NVMe storage proxy engine 404 and a virtual NVMe access engine 406, which function in a similar fashion as the respective NVMe storage proxy engine 104 and a NVMe access engine 106 discussed above. In some embodiments, the virtual NVMe storage proxy engine 404 in each virtual NVMe controller 402 is configured to access both the locally attached storage devices 120 and remotely accessible storage devices 122 via the storage access engine 108, which can be shared by all the virtual NVMe controllers 402 running on the physical NVMe controller 102.

During its operation, each virtual NVMe controller 402 creates and maps one or more logical volumes in one or more NVMe namespaces mapped to a plurality of remote storage devices 122 accessible over a network. Each virtual NVMe controller 402 then presents the NVMe namespaces of the logical volumes to its corresponding VM 110 running on the host 112 as if they were local storage volumes, and enable the VM 110 to access the logical volumes mapped to the remote storage devices 122.

In some embodiments, each virtual NVMe controller 402 depicted in FIG. 4 has one or more pairs of submission queue 212 and completion queue 214 associated with it, wherein each queue can accommodate a plurality of entries of instructions from one of the VMs 110. As discussed above, the instructions in the submission queue 212 are first fetched by the NQM 204 from the memory 210 of the host 112 to the waiting buffer 218 of the NVMe processing engine 202. During its operation, each virtual NVMe controller 402 retrieves the instructions from its corresponding VM 110 from the waiting buffer 218 and converts the instructions according to the storage network protocol in order to perform a read/write operation on the data stored on the local storage devices 120 and/or remote storage devices 122 over the network by invoking VF functions provided by the physical NVMe controller 102. During the operation, data is transmitted to or received from the local/remote storage devices in the logical volume of the VM 110 via the interface to storage access engine 108. Once the operation has been processed, the virtual NVMe controller 402 saves the status of the executed instructions in the waiting buffer 218 of the processing engine 202, which are then placed into the completion queue 214 by the NQM 204. The data being processed by the instructions of the VMs 110 is also transferred between the data buffer 216 of the memory 210 of the host 112 and the memory 208 of the NVMe processing engine 202.

Figure 5:
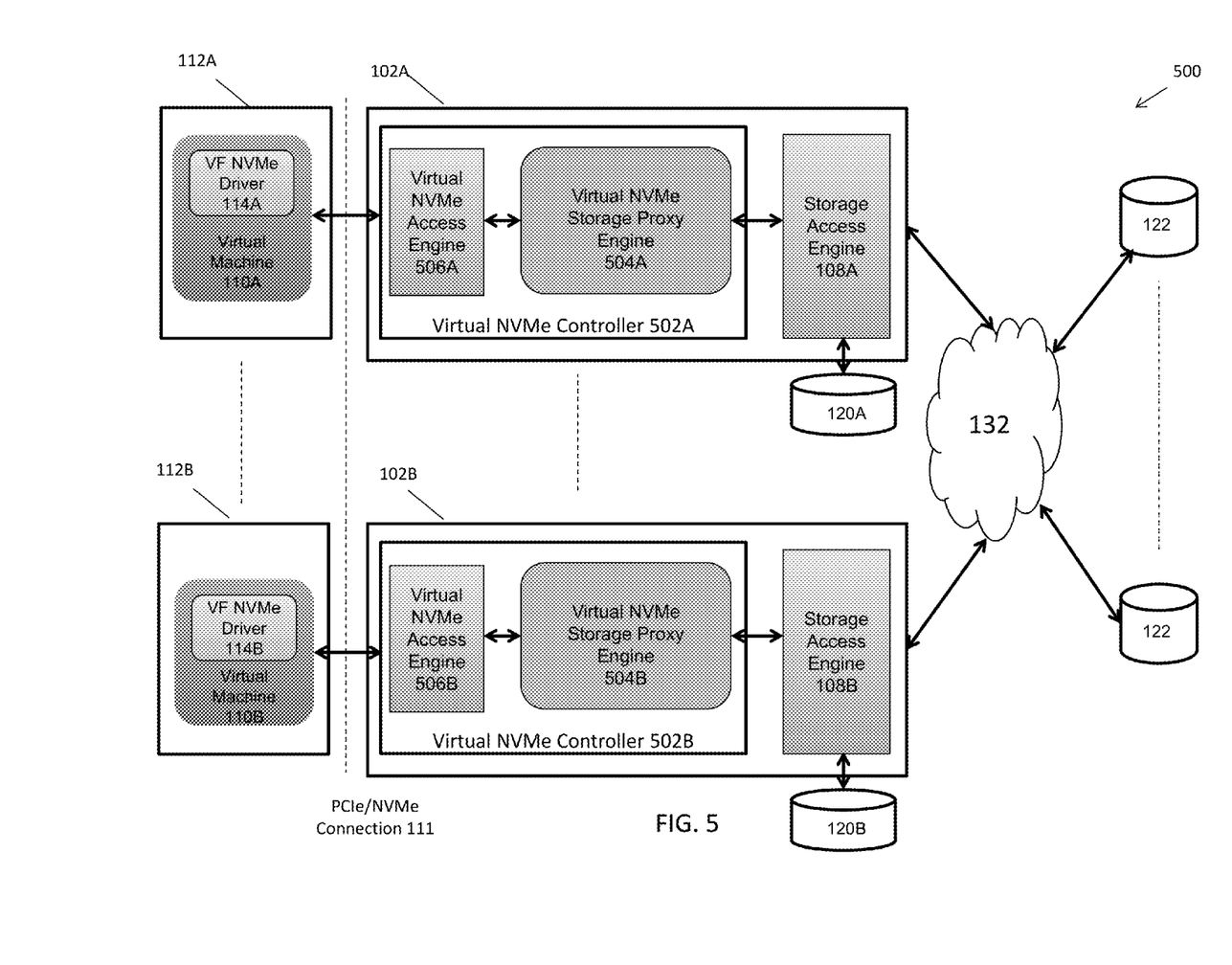
FIG. 5 depicts a non-limiting example of a diagram of system to support live migration of virtual machines accessing a set of remote storage devices over a network via NVMe controller from a current host to a destination host in accordance with some embodiments.

FIG. 5 depicts a non-limiting example of a diagram of system 500 to support migration of virtual machines accessing remote storage devices over a network via NVMe controller from a current/source host 112A to a destination host 112B. As shown in the example of FIG. 5, the VM 110A running on the current host 112A is presented by the virtual NVMe controller 502A running on the physical NVMe controller 102A with one or more logical volumes mapped to remote storage volumes 122 accessible over the network 132. The VM 110A may then perform a plurality of storage (read/write) operations on the logical volumes mapped to the remote storage volumes 122 at the time when the VM 110A is being migrated from the current host 112A to another (destination) host 112B physically coupled to a different physical NVMe controller 102B. When the VM 110A is migrated to the destination host 112B as a new VM instance 110B as a duplication of VM 110A, a new virtual NVMe controller 502B needs to be created to serve the storage operations of the VM 110B. Here, the new virtual NVMe controller 502B is a duplication of the virtual NVMe controller 502A and all current states of the virtual NVMe controller 502A in use by the VM 110A are migrated to the virtual NVMe controller 502B. In some embodiments, the new virtual NVMe controller 502B can be created on a different physical NVMe controller 102B from the NVMe controller 502A (when the destination host 112B is physically coupled to the NVMe controller 102B instead of the NVMe controller 102A) as depicted by the example in FIG. 5.

During the migration of the VM 110A, the current host 112A (through its hypervisor) is configured to allow the virtual NVMe controllers running on the first physical NVMe controller 102A to be migrated on a per VF-basis, e.g., only the states of the virtual NVMe controller 502A currently serving the VM 110A is migrated/copied to the new virtual NVMe controller 502B on the physical NVMe controller 102B while other virtual NVMe controller(s) running on the physical NVMe controller 102A are not affected and/or migrated. Here, the states of the virtual NVMe controller 502A include but are not limited to status of various storage operations initiated by the VM 110A to the remote storage devices 122 that are still pending as well as network connections to the remote storage devices 122.

As part of the migration of the VM 110A, the hypervisor of the current host 112A is configured to first put the virtual NVMe controller 502A currently serving the VM 110A into a quiesce state, at which the virtual NVMe controller 502A is temporarily inactive or disabled and stops to serve the storage operations to the remote storage devices 122. Once the NVMe controller 502A is at the quiesce state, the current host 112A is configured to capture an image (snapshot) of the states of the virtual NVMe controller 502A (via the virtual NVMe storage proxy engine 504A as discussed below) and save the image in a buffer of the current host 112A. The saved image can then be used by current host 112A to program/create the new virtual NVMe controller 502B on the physical NVMe controller 102B, wherein the new virtual NVMe controller 502B has exactly the same states as the virtual NVMe controller 502A in the quiesce state. In some embodiments, the image is moved to the While the NVMe controller 502A is in the quiesce state, the NVMe driver 114A of the VM 114A configured to interact with the virtual NVMe controller 502A is also frozen to maintain its current state.

In some embodiments, the virtual NVMe storage proxy engine 504A of the virtual NVMe controller 502A is configured to utilize and program a set of registers/memory 208 per virtual NVMe controller on the physical NVMe controller 102A to maintain the states information of the virtual NVMe controller 502A during its normal operation. As discussed above, a special command/instruction can be first fetched from the memory of the host 112A running the VM 110A to the waiting buffer 218 of the NVMe processing engine 202. During its operation, the virtual NVMe storage proxy engine 504A retrieves the instruction from the waiting buffer 218. Upon receiving a special command/instruction from the current host 112A, the virtual NVMe storage proxy engine 504A is configured to stop all data traffic/transmissions on the virtual NVMe controller 502A. The virtual NVMe storage proxy engine 504A is further configured to read the registers and provide an image of the states of the virtual NVMe controller 502A stored in the registers to the host 112A. Once the operations are complete, the virtual NVMe storage proxy engine 504A saves the status of the executed instruction in the waiting buffer 218 of the processing engine 202, which are then placed into the completion queue 214 of the NVMe controller 102A.

During the migration of the VM 110A, the current host 112A is configured to instantiate/create the VM 110B on the destination host 112B and bring it online, wherein the VM 110B is a copied/migrated version of VM 110A. Various resources accessed by the VM 110A (including the image of the current states of the virtual NVMe controller 502A) are also copied to the destination host 112B to be accessed by the VM 110B. The host 112A or 112B is then configured to submit another special command/instruction with the image of the current states of the virtual NVMe controller 502A as its data to the NVMe controller 102B. The virtual NVMe storage proxy engine 504B of the virtual NVMe controller 502B is configured to read from the image and program the registers/memory for the virtual NVMe controller 502B to bring it to the states that existed when the virtual NVMe controller 502A was in the quiesce state. The VF NVMe driver 114B of the VM 110B can then initiate or resume the storage operations to the logical volumes mapped to the remote storage devices from the state when they were frozen w/o being affected by the migration of the VM 110A. Note that both virtual NVMe controllers 502A and 502B have the same set of remote storage devices mapped to the logical volumes and exported to the VM 110A and 110B, respectively, using iSCSI-like protocol.

In some embodiments, the current host 112A is configured to reset the states of the virtual NVMe controller 502A and re-assign it to serve another VM after the VM 110A has been migrated from the current host 112A to the destination host 112B and the new virtual NVMe controller 502B has been instantiated to serve the migrated VM 110B.

Figure 6:
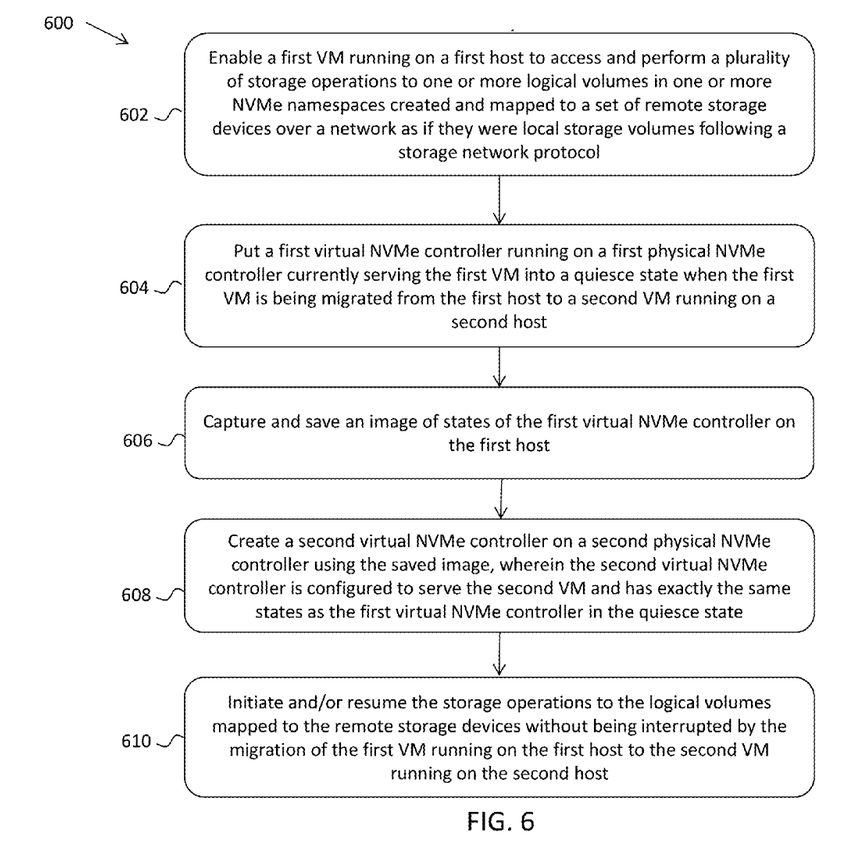
FIG. 6 depicts a flowchart of an example of a process to support migration of virtual machines accessing remote storage devices over a network via NVMe controller from a current host to a destination host in accordance with some embodiments.

FIG. 6 depicts a flowchart of an example of a process to support live migration of virtual machines accessing remote storage devices over a network via NVMe controller from a current host to a destination host. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 6, the flowchart 600 starts at block 602, where a first virtual NVMe controller is created on the first NVMe controller, wherein the first virtual NVMe controller is configured to enable a first virtual machine (VMs) running on a first host to access and perform a plurality of storage operations to one or more logical volumes in one or more NVMe namespaces created and mapped to a set of remote storage devices over a network as if they were local storage volumes following a storage network protocol. The flowchart 600 continues to block 604, wherein the first virtual NVMe controller currently serving the first VM is put into a quiesce state when the first VM is being migrated from the first host to a second VM running on a second host. The flowchart 600 continues to block 606, where an image of states of the first virtual NVMe controller is captured and saved on the first host. The flowchart 600 continues to block 608, where a second virtual NVMe controller is created on a second physical NVMe controller using the saved image, wherein the second virtual NVMe controller is configured to serve the second VM and has exactly the same states as the first virtual NVMe controller in the quiesce state. The flowchart 600 ends at block 610, where the storage operations to the logical volumes mapped to the remote storage devices are initiated or resumed by the second virtual NVMe controller without being interrupted by the migration of the first VM running on the first host to the second VM running on the second host.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A computer-implemented method to support migration of virtual machines (VMs) accessing a set of remote storage devices over a network via non-volatile memory express (NVMe) controllers, comprising:

enabling a first VM running on a first host to access and perform a plurality of storage operations to one or more logical volumes in one or more NVMe namespaces created and mapped to the remote storage devices accessible by a first virtual NVMe controller only over the network as if they were local storage volumes following a storage network protocol;

putting said first virtual NVMe controller running on a first physical NVMe controller currently serving the first VM into a quiesce state when the first VM is being migrated from the first host to a second VM running on a second host;

capturing and saving an image of states of the first virtual NVMe controller on the first host;

creating a second virtual NVMe controller on a second physical NVMe controller using the saved image, wherein the second virtual NVMe controller is configured to serve the second VM and has exactly the same states as the first virtual NVMe controller in the quiesce state;

initiating and/or resuming the storage operations to the logical volumes mapped to the remote storage devices accessible by the second virtual NVMe controller over the network without being interrupted by the migration of the first VM running on the first host to the second VM running on the second host.

2. The method of claim 1, wherein:
the first host is coupled to the first physical NVMe controller and the second host is coupled to the second physical NVMe controller.

3. The method of claim 1, wherein:
the first physical NVMe controller and the second physical NVMe controller are different.

4. The method of claim 1, wherein:
the logical volumes further include storage devices attached to the physical NVMe controller locally.

5. The method of claim 1, wherein:
the storage network protocol is Internet Small Computer System Interface (iSCSI).

6. The method of claim 1, wherein:
the states of the first virtual NVMe controller include status of the pending storage operations initiated by the first VM to the logical volumes mapped to the remote storage devices and/or network connections to the remote storage devices.

7. The method of claim 1, wherein:
the first virtual NVMe controller is temporarily inactive or disabled and stops to serve the storage operations to the remote storage devices at the quiesce state.

8. The method of claim 1, further comprising:
utilizing and programming a set of registers per the first virtual NVMe controller on the first physical NVMe controller to maintain the states information of the first virtual NVMe controller during its normal operation.

9. The method of claim 1, further comprising:
allowing the first virtual NVMe controller running on the first physical NVMe controller to be migrated on a per Virtual Function (VF)-basis, where only the states of the first virtual NVMe controller currently serving the first VM is migrated/copied to the second virtual NVMe controller on the second physical NVMe controller while other virtual NVMe controller(s) running on the first physical NVMe controller are not affected and/or migrated.

10. The method of claim 1, further comprising:
resetting the states of the first virtual NVMe controller and re-assigning it to serve another VM after the first VM has been migrated from the first host to the second host and the second virtual NVMe controller has been instantiated to serve the migrated second VM.

11. The method of claim 1, further comprising:
reading from the image and programming a set of registers per the second virtual NVMe controller on the first physical NVMe controller to bring the second virtual NVMe controller to the states that existed when the first virtual NVMe controller was in the quiesce state.

12. The method of claim 1, further comprising:
mapping and exporting the same set of remote storage devices to the logical volumes to the first and the second VMs via the first and the second virtual NVMe controllers, respectively, using the storage network protocol.

13. A system to support migration of virtual machines (VMs) accessing a set of remote storage devices over a network via non-volatile memory express (NVMe) controllers, comprising:
a first physical NVMe controller including a first virtual NVMe controller running on it, which in operation, is configured to:
enable a first VM running on a first host to access and perform a plurality of storage operations to one or more logical volumes in one or more NVMe namespaces created and mapped to the remote storage devices accessible by the first virtual NVMe controller only over the network as if they were local storage volumes following a storage network protocol;
said first host, which in operation, is configured to:
put the first virtual NVMe controller currently serving the first VM into a quiesce state when the first VM is being migrated from the first host to a second VM running on a second host;
capture and save an image of states of the first virtual NVMe controller on the first host;
create a second virtual NVMe controller on a second physical NVMe controller using the saved image, wherein the second virtual NVMe controller is configured to serve the second VM and has exactly the same states as the first virtual NVMe controller in the quiesce state;
said second physical NVMe controller including said second virtual NVMe controller running on it, which in operation, is configured to:
initiate and/or resume the storage operations to the logical volumes mapped to the remote storage devices accessible by the second virtual NVMe controller over the network without being interrupted by the migration of the first VM running on the first host to the second VM running on the second host.

14. The system of claim 13, wherein:
each of the first and the host is an x86/ARM server.

15. The system of claim 13, wherein:
the first host is coupled to the first physical NVMe controller and the second host is coupled to the second physical NVMe controller.

16. The system of claim 13, wherein:
the first physical NVMe controller and the second physical NVMe controller are different.

17. The system of claim 13, wherein:
the logical volumes further include storage devices attached to the physical NVMe controller locally.

18. The system of claim 13, wherein:
the storage network protocol is Internet Small Computer System Interface (iSCSI).

19. The system of claim 13, wherein:
the states of the first virtual NVMe controller include status of the pending storage operations initiated by the first VM to the logical volumes mapped to the remote storage devices and/or network connections to the remote storage devices.

20. The system of claim 13, wherein:
the first virtual NVMe controller is temporarily inactive or disabled and stops to serve the storage operations to the remote storage devices at the quiesce state.

21. The system of claim 13, wherein:
the first virtual NVMe controller is configured to utilize and program a set of registers per the first virtual NVMe controller on the first physical NVMe controller to maintain the states information of the first virtual NVMe controller during its normal operation.

22. The system of claim 13, wherein:
the first host is configured to allow the first virtual NVMe controller running on the first physical NVMe controller to be migrated on a per Virtual Function (VF)-basis, where only the states of the first virtual NVMe controller currently serving the first VM is migrated/copied to the second virtual NVMe controller on the second physical NVMe controller while other virtual NVMe controller(s) running on the first physical NVMe controller are not affected and/or migrated.

23. The system of claim 13, further comprising:
the first host is configured to reset the states of the first virtual NVMe controller and re-assign it to serve another VM after the first VM has been migrated from the first host to the second host and the second virtual NVMe controller has been instantiated to serve the migrated second VM.

24. The system of claim 13, wherein:
the second virtual NVMe controller is configured to read from the image and program a set of registers per the second virtual NVMe controller on the first physical NVMe controller to bring the second virtual NVMe controller to the states that existed when the first virtual NVMe controller was in the quiesce state.

25. The system of claim 13, wherein:
both the first and the second virtual NVMe controllers have the same set of remote storage devices mapped to the logical volumes and exported to the first and the second VMs, respectively, using the storage network protocol.

* * * * *